United States Patent
Waller et al.

(10) Patent No.: US 10,228,554 B2
(45) Date of Patent: Mar. 12, 2019

(54) PARTIALLY COHERENT PHASE RECOVERY

(71) Applicants: THE REGENTS OF THE UNIVERSITY OF CALIFORNIA, Oakland, CA (US); NANYANG TECHNOLOGICAL UNIVERSITY, Singapore (SG)

(72) Inventors: Laura Waller, Berkeley, CA (US); Jingshan Zhong, Berkeley, CA (US); Lei Tian, Berkeley, CA (US); Justin Dauwels, Singapore (SG)

(73) Assignees: THE REGENTS OF THE UNIVERSITY OF CALIFORNIA, Oakland, CA (US); NANYANG TECHNOLOGICAL UNIVERSITY, Singapore (SG)

( * ) Notice: Subject to any disclaimer, the term of this patent is extended or adjusted under 35 U.S.C. 154(b) by 38 days.

(21) Appl. No.: 15/257,289

(22) Filed: Sep. 6, 2016

(65) Prior Publication Data

US 2017/0059845 A1    Mar. 2, 2017

Related U.S. Application Data

(63) Continuation of application No. PCT/US2015/019279, filed on Mar. 6, 2015.
(Continued)

(51) Int. Cl.
*G06K 9/00* (2006.01)
*G02B 21/36* (2006.01)
(Continued)

(52) U.S. Cl.
CPC ....... *G02B 21/367* (2013.01); *G02B 27/0012* (2013.01); *G02B 27/52* (2013.01);
(Continued)

(58) Field of Classification Search
CPC combination set(s) only.
See application file for complete search history.

(56) References Cited

U.S. PATENT DOCUMENTS 7,120,276 B1 * 10/2006 Brady ................. G06K 9/6206
                                                              382/107
7,526,100 B1    4/2009 Hartman
(Continued)

FOREIGN PATENT DOCUMENTS

EP    1387505 A2    2/2004

OTHER PUBLICATIONS

Korean Intellectual Property Office (KIPO), International Search Report and Written Opinion, PCT International Application No. PCT/US2015/019279, dated May 29, 2015, pp. 1-13, with claims searched, pp. 14-18.

*Primary Examiner* — Alex Kok S Liew
(74) *Attorney, Agent, or Firm* — O'Banion & Ritchey LLP; John P. O'Banion

(57) ABSTRACT

A system and method for incorporating partially coherent illumination models into the problem of phase and amplitude retrieval from a stack of intensity images. The recovery of phase could be realized by many methods, including Kalman filters or other nonlinear optimization algorithms that provide least squares error between the measurement and estimation.

14 Claims, 4 Drawing Sheets

Related U.S. Application Data

(60) Provisional application No. 61/949,420, filed on Mar. 7, 2014.

(51) Int. Cl.
*G02B 27/52* (2006.01)
*G02B 27/00* (2006.01)
*G06T 5/10* (2006.01)
*G02B 21/14* (2006.01)

(52) U.S. Cl.
CPC .............. *G06T 5/10* (2013.01); *G02B 21/14* (2013.01); *G06T 2207/10056* (2013.01); *G06T 2207/20024* (2013.01)

(56) References Cited

U.S. PATENT DOCUMENTS

| | | | |
|---|---|---|---|
| 2002/0033818 A1* | 3/2002 | Lin | G06K 9/00201 345/419 |
| 2005/0105097 A1* | 5/2005 | Fang-Yen | G01B 9/02072 356/497 |
| 2013/0202151 A1 | 8/2013 | Dauwels et al. | |
| 2013/0335548 A1 | 12/2013 | Kim et al. | |
| 2013/0335819 A1 | 12/2013 | Cooper | |

\* cited by examiner

PARTIALLY COHERENT PHASE RECOVERY

CROSS-REFERENCE TO RELATED APPLICATIONS

This application is a 35 U.S.C. § 111(a) continuation of PCT international application number PCT/US2015/019279 filed on Mar. 6, 2015, incorporated herein by reference in its entirety, which claims priority to, and the benefit of, U.S. provisional patent application Ser. No. 61/949,420 filed on Mar. 7, 2014, incorporated herein by reference in its entirety. Priority is claimed to each of the foregoing applications.

The above-referenced PCT international application was published as PCT International Publication No. WO 2015/134924 on Sep. 11, 2015, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This description pertains generally to quantitative phase imaging, and more particularly to phase imaging with partially coherent illumination.

2. Background Discussion

Quantitative phase imaging has applications in biology and surface metrology, since objects of interest often do not absorb light but cause measurable phase delays. Phase cannot be directly measured by a camera, and so phase objects are invisible, i.e. transparent, in an in-focus imaging system. Phase retrieval methods use a series of images taken with various complex transfer functions. Methods that use intensity images measured through focus are especially interesting because they have the advantage of a simple experimental setup and wide applicability. The stack of defocused intensity images can be obtained in an imaging system with an axial motion stage and microscope.

Traditional methods for phase imaging include phase contrast microscopy, differential interference contrast (DIC) microscopy, and digital holography microscopy. Phase contrast microscopy and DIC image phase non-quantitatively. Digital holography microscopy can recover phase quantitatively, but it needs to measure an interference hologram to recover phase and thus requires laser illumination and a reference beam, significantly complicating the experimental setup and making it difficult to incorporate into existing imaging systems.

The Kalman filter method is an improved alternative to the transport of intensity equation (TIE) method, which is not robust to noise in the measurement. Kalman filtering can provide the information theoretic near-optimal phase solution, even in severe noise. However, standard Kalman filtering has limitations in practical use because of its high computational complexity and storage requirement.

When doing phase imaging in a commercial microscope, the partially coherent illumination can cause blurring of the phase result if a coherent model is used. The effect of partially coherent illumination has been neglected in most previous phase recovery algorithms.

BRIEF SUMMARY

One aspect of the present description is a method for incorporating partially coherent illumination models into the problem of phase and amplitude retrieval from a stack of intensity images. The recovery of phase could be realized by many methods, including Kalman filters or other nonlinear optimization algorithms that provide least squares error between the measurement and estimation.

In one embodiment, the nonlinear optimization algorithms chosen for partially coherent phase recovery is the Kalman filter phase imaging method, which is valid for phase from defocus stacks as well as any other complex transfer function for introducing phase contrast. The Kalman filtering method is fast, efficient, robust to noise, and able to handle arbitrary source distribution when used in a microscope with Köhler illumination. By using a sparse Kalman filter, the computational complexity was reduced from $\mathcal{O}(N^3)$ to $\mathcal{O}(N \log N)$, where N is the number of pixels in the phase construction.

In another embodiment, another optimization includes recovering the complex field by using nonlinear least square error to fit over the measured intensity images. It aims to find an optimal estimation to minimize the average square error between measurement and predicted measurement (cost function). One can use gradient descent, L-BFGS method, or other nonlinear conjugate gradient methods to solve for phase. Newton's method, Gauss-Newton or similar methods which use second order derivative (Hessian) are generally difficult to implement because they require solving large linear equations related to Hessian. By exploiting the efficiency of computing the multiplication of Hessian with vector with Fast Fourier transform (FFT), an efficient and fast method is derived to solve the linear equations iteratively with a conjugate gradient method.

Features of the systems and methods of the present disclosure include, but are not limited to, the following:

(1) Recovery of phase of an object when it is illuminated with partially coherent illumination. This allows the systems and methods of the present disclosure to have applicability for commercial optical microscopes, electron, tabletop X-ray imaging systems (medical), synchotron imaging systems, and lithography aerial imaging systems, among other applications.

(2) Recovery of phase for arbitrary shape of Köhler illumination. In lithography, dipole or multiple illumination is widely used and phase is a well-known diagnostic test for mask and wafer defects. Thus, the systems and methods of the present disclosure will be particularly advantageous for phase imaging in both wafer and mask inspection and metrology.

(3) Application to cases involving strong noise, such as low photon counts caused by high-throughput imaging. The Kalman filtering technique of the systems and methods of the present disclosure is robust to noise because the Kalman filter gives a near-optimal estimation from a series of noisy measurements.

(4) The systems and methods of the present disclosure are applicable for any variety of complex transfer functions between the captured intensity images. Propagation (defocus) is used in the present description only as a simple example because it is experimentally easy. Alternatively, phase or amplitude filters or other linear optical systems can replace the propagation transfer function with their appropriate transfer function to achieve a phase result with the same method.

(5) When used in a microscope, the systems and methods of the present disclosure only require simple experimental alignment, compared to digital holography which needs a complicated alignment. The systems and methods of the present disclosure provide quantative phase, while phase contrast microscopes only show a nonquantative phase image.

Applications for the technology of the present disclosure include, but are not limited to, the following:

(1) Wavefront reconstruction in commercial optical microscopes, electron, tabletop X-ray imaging systems (medical), synchotron imaging systems, and lithography aerial imaging systems, among other applications.

(2) Phase imaging in wafer and mask inspection.

Further aspects of the technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

Figure 5:
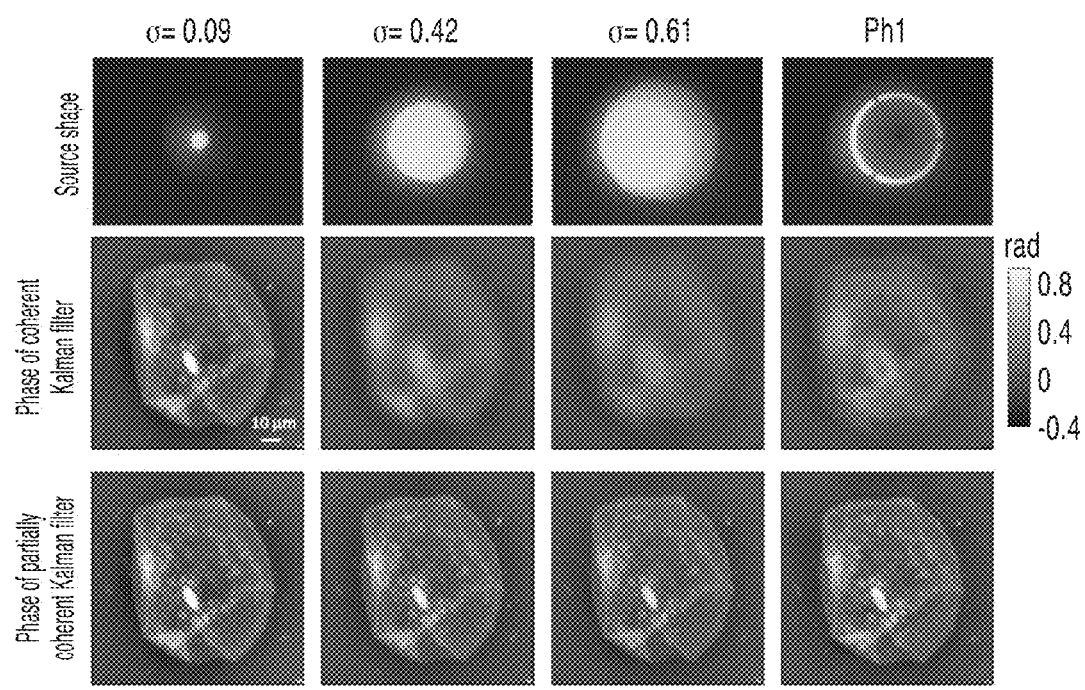

FIG. 5 shows a series of images for comparison of experimental results by coherent Kalman filter and partially coherent Kalman filter. In the top row are source shapes taken by a 2f system at the microscope's side port. The middle row shows recovered phase by the coherent Kalman filter. The bottom row shows recovered phase by the partially coherent Kalman filter of the present description.

DETAILED DESCRIPTION

1. System Configuration

Figure 1:
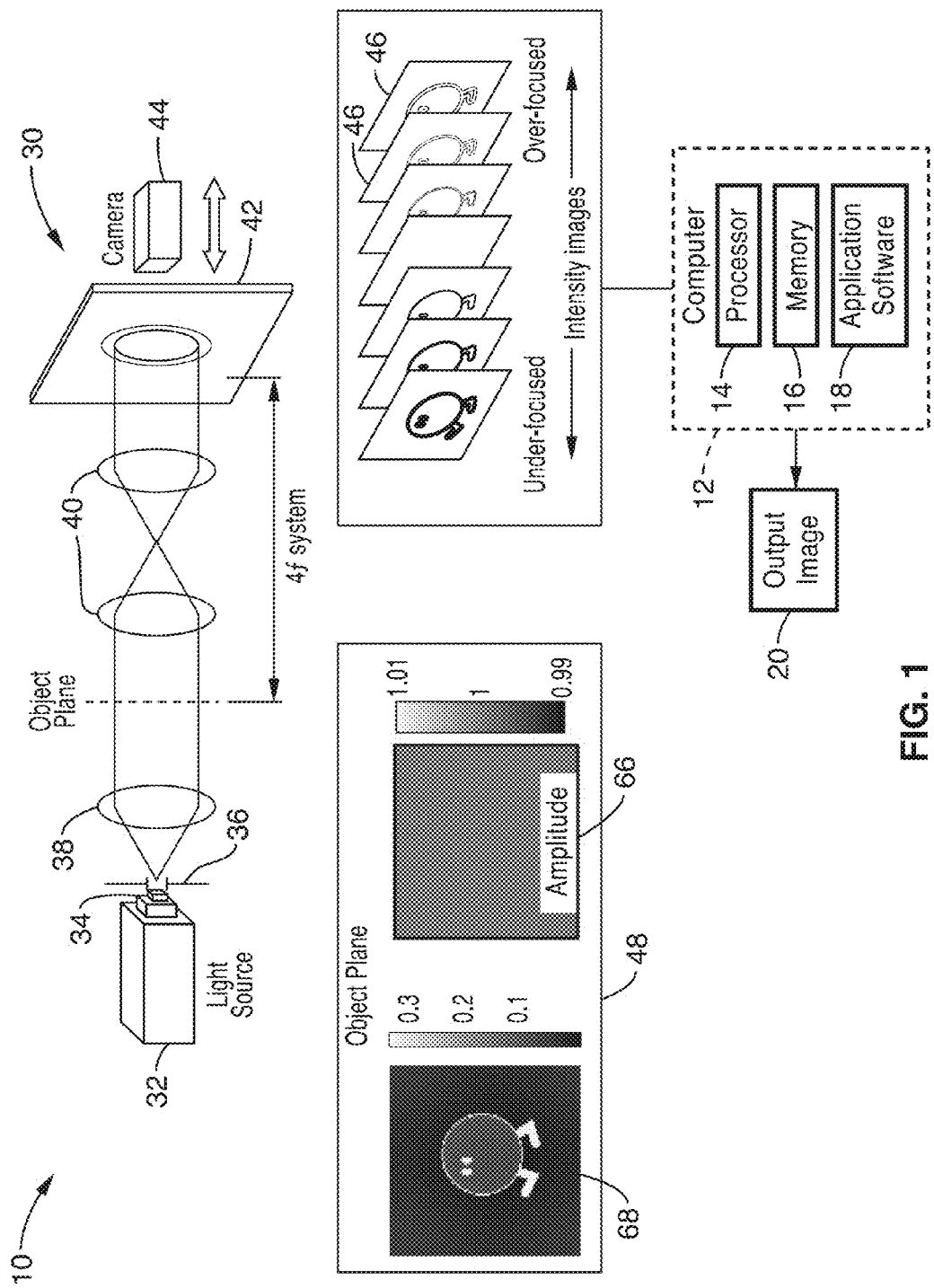
FIG. 1 shows a schematic diagram of the image processing system of the present invention implemented with a 4f microscope.

Referring to FIG. 1 a schematic diagram of the image processing system 10 of the present invention is shown implemented in a Köhler system configuration with a 4f microscope 30.

When an object is illuminated by a coherent source, the optical field at z is described with $A(x, y, z) = |A(x, y, z)| e^{i\phi(x, y, z)}$, where $|A(x, y, z)|$ is the amplitude, and $\phi(x, y, z)$ is the phase. Free space wave propagation is modeled with wave propagation Eq. 1:

$$\frac{\partial A(x, y, z)}{\partial z} = \frac{i\lambda}{4\pi} \nabla_\perp^2 A(x, y, z), \quad \text{Eq. 1}$$

where $\lambda$ is the wavelength of the illumination, and $\nabla_\perp$ is the gradient operator in the lateral (x, y) dimensions.

To include partially coherent illumination into the Kalman filter model of the present description, an incoherent extended source is assumed in the Köhler system configuration. The intensity $I(x, y, z)$ defocused by z can be written as a convolution between the intensity from coherent illumination $|A(x, y, z)|^2$ and a scaled source intensity distribution $S(x, y)$:

$$I(x, y, z) = |A(x, y, z)|^2 \otimes S\left(-\frac{f}{z}x, -\frac{f}{z}y\right), \quad \text{Eq. 2}$$

where f is the focal length of the condenser lens 40 of microscope 30. Light from incoherent white light source 32 is filtered by a narrow-band color filter 34, and is placed after collimator 38 at the front focal plane of the condenser 40. The spatial coherence of the illumination is adjusted by the size of the iris 36 placed immediately behind the color filter 34. A 4f system images the object onto the camera 44 and a through-focus intensity stack 46 is taken by moving the sample (at object plane 48) along the optical axis (or moving the focal plane 42 of the camera or objective, e.g. with an x-y stage (not shown)).

Image processing of the stack 46 of intensity images for phase 68 and amplitude 66 retrieval is performed via computer 12 and application software 18. Application software 18 comprises instructions, including algorithms of the present invention (such as method 50 of FIG. 2), stored in memory 16 and executable on processor 14 for receiving intensity image stack images 46 and transforming the data to an output image 20.

While FIG. 1 is detailed with reference to an optical microscope 30, it is appreciated that the application software may be implemented on one or more of: electron or tabletop X-ray imaging systems (medical), synchotron imaging systems, and lithography aerial imaging systems, and phase imaging in both wafer and mask inspection and metrology, among other applications.

2. Recursively Updating the Estimate by Sparse Kalman Filter

The optical complex field $A(x, y, z)$ is discretized as a raster-scanned complex column vector $a_n$, and the intensity measurement I(x, y, z) is similarly discretized as column vector $I_n$. The 2-D Fourier transform of A(x, y, z) is denoted by b(u, v, z). The column vector $b_n$ is again raster-scanned from b(u, v, z), and hence can be expressed as $b_n = K a_n$, where K is the discrete Fourier transform (DFT) matrix.

The relation between two images with distance $\Delta z$ in Fourier domain can be written as Eq. 3:

$$b_n = H b_{n-1}. \quad \text{Eq. 3}$$

Supposing the measurement of the intensity of the camera is modeled with Poisson noise, the Poisson noise with Gaussian distribution can be modeled as:

$$I_n = \gamma C_n |a_n|^2 + v, \quad \text{Eq. 4}$$

where v is a Gaussian vector with zero mean and covariance $R = \gamma \text{diag}(C_n |a_n|^2)$. The matrix $C_n$ describes the convolution of the scaled source intensity distribution S(x, y) at $z_n$. Here $a_n^*$ denotes the complex conjugate of $a_n$, and $\text{diag}(a_n^*)$ is a diagonal matrix with its corresponding diagonal entries equal to the elements in the vector $a_n^*$.

The nonlinear observation model in Eq. 4 is linearized as:

$$I_n = \gamma C_n |\hat{a}_n|^2 + \gamma C_n \text{diag}(\hat{a}_n^*)(a_n - \hat{a}_n) + \gamma C_n \text{diag}(\hat{a}_n)(\hat{a}_n - \hat{a}_n^*) + v, \quad \text{Eq. 5}$$

where $\hat{a}_n$ is the state predicted from the previous n−1 observations, and Eq. 5 is the first order Taylor series expansion of Eq. 4 with respect to $\hat{a}_n$.

Summarizing, the augmented state space model is given as:

$$\text{State:} \begin{bmatrix} b_n \\ b_n^* \end{bmatrix} = \begin{bmatrix} H & 0 \\ 0 & H^* \end{bmatrix} \begin{bmatrix} b_{n-1} \\ b_{n-1}^* \end{bmatrix}, \quad \text{Eq. 6}$$

$$\text{Observation:} I_n = \begin{bmatrix} J_n & J_n^* \end{bmatrix} \begin{bmatrix} b_n \\ b_n^* \end{bmatrix} - \gamma C_n |\hat{a}_n|^2 + v, \text{ with } v \sim (0, R), \quad \text{Eq. 7}$$

where $$R = \gamma \text{diag}(C_n |a_n|^2), \text{ and } J_n = \gamma C_n \text{diag}(\hat{a}_n^*) K^H. \quad \text{Eq. 8}$$

Figure 2:
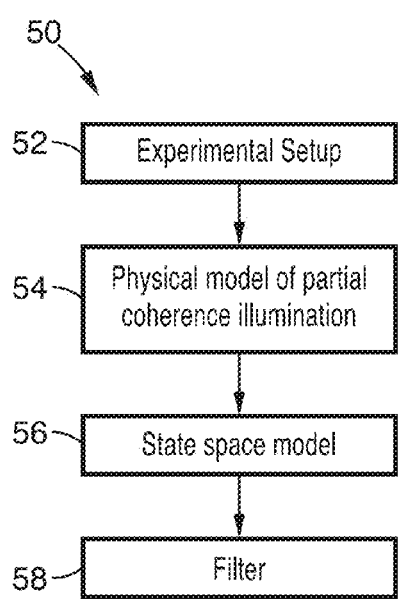
FIG. 2 shows a high-level flow diagram for a method of obtaining the state-space Kalman filter in accordance with the present description.

FIG. 2 shows a high-level flow diagram for a method 50 of obtaining the state-space Kalman filter in accordance with the present description. First, the process starts with the experimental setup as step 52 (see setup shown in FIG. 1). Next, the partial coherence is modeled mathematically at step 54 and a state-space Kalman filter is formulated from the physical model at step 56. After the state-space Kalman filter, the standard Kalman filter is used to estimate the phase at step 58.

However, the computational complexity of this estimation is $\mathscr{O}(N^3)$ where N is the total number of the pixels in the image. A sparse model may be adopted at step 56 to reduce the computational complexity to $\mathscr{O}(N \log N)$. The resulting sparse algorithm is summarized in Table 2. The diagonal entries of diagonal matrix S in Table 2 are equal to Fourier transform of the scaled source $$S\left(-\frac{f}{z}x, -\frac{f}{z}y\right).$$

In order to compensate the error of the first order approximation, a forward and backward sweep of the Kalman filter improves the recovered result iteratively. The computational complexity increases linearly with number of iterations.

3. Nonlinear Least Square Error Method

It is appreciated that the Kalman filter algorithm detailed above is only one of several methods that may be used to solve phase from intensity images of partially coherent illumination. The Kalman filter method processes the intensity images in a recursive manner. Basically, the optimization problem could be formulated as nonlinear least square problem, minimizing a cost function over the estimation:

$$\min_b F = \frac{1}{2} \sum_{n=1}^{N_{im}} \left(I_n - C_n |K^H H_n b|^2\right)^H \left(I_n - C_n |K^H H_n b|^2\right), \quad \text{Eq. 9}$$

where b is a vector denoting Fourier transform of the unknown complex field at z=0, and $H_n$ is a diagonal matrix denote wave propagation for the plane of the unknown complex field to the plane of the measurement $I_n$, and $N_{im}$ is the total number of the intensity images. Minimizing the cost function (the error between measurement and prediction) gives an optimal solution of b.

The nonlinear least square problem may be solved with a Gradient descent method, Newton's method, Gauss-Newton method, or similar methods. These methods involve calculating the gradient and Hessian (approximation of Hessian for Gauss-Newton method) of the cost function. Since the b is complex variable, we use an augmented complex variable $[b \ \bar{b}]^T$ so that the theory of CR calculus can be used to calculate the gradient and Hessian derivation. Gradient, F'(b, $\bar{b}$), and approximation of Hessian F''(b, $\bar{b}$) are derived as follows:

$$F'(b, \bar{b}) = \sum_{n=1}^{N_{im}} \begin{bmatrix} -\overline{H}_n K_{diag}(K^H H_n b) C_n^H \\ -H_n K_{diag}^H (K \overline{H}_n \bar{b}) C_n^H \end{bmatrix} \left[I_n - C_n |K^H H_n b|^2\right], \quad \text{Eq. 10}$$

$$F''(b, \bar{b}) \approx \sum_{n=1}^{N_{im}} \begin{bmatrix} \overline{H}_n K \text{diag}(K^H H_n b) C_n^H & \overline{H}_n K \text{diag}(K^H H_n b) C_n^H \\ C_n \text{diag}(K \overline{H}_n \bar{b}) K^H H_n & C_n \text{diag}(K^H H_n b) K \overline{H}_n \\ H_n K^H \text{diag}(K \overline{H}_n \bar{b}) C_n^H & H_n K^H \text{diag}(K \overline{H}_n \bar{b}) C_n^H \\ C_n \text{diag}(K \overline{H}_n \bar{b}) K^H H_n & C_n \text{diag}(K^H H_n b) K \overline{H}_n \end{bmatrix}. \quad \text{Eq. 11}$$

With the Gradient, one may use a Gradient descent method to solve for the nonlinear optimization problem. However, gradient descent method is slow in convergence. Improvement of convergence usually needs the second order derivative of the cost function—Hessian or approximation of Hessian. Newton's method, Gauss-Newton method and Levenberg-Marquardt algorithm use the second order derivative information to obtain a search direction for the estimation update, but require solving a big linear equations system. The linear equations system is related to Gradient and Hessian, expressed as:

$$F''(b, \bar{b}) \begin{bmatrix} x \\ \bar{x} \end{bmatrix} = -F'(b, \bar{b}), \quad \text{Eq. 12}$$

where the solution of the linear equations $[x \ \bar{x}]^T$ is the search direction. Since the Hessian matrix of our problem (size $N^2$)

is large, it is difficult to compute and invert the big matrix or solve linear equations of the Hessian matrix. An alternative choice is use L-BFGS method which approximates the Hessian and inversion of Hessian from the gradient of the previous estimations. The drawback of L-BFGS method is that the convergence is highly reliant on the number of estimations used to approximate the Hessian.

The present disclosure incorporates a new method to solve the linear equations system iteratively. The matrix F"(b, b̄) includes DFT matrix K and circulant matrix $C_n$, which denotes convolution. So the multiplication of the matrix F"(b, b̄) with a vector can be computed with FFT, which has the computational complexity to $\mathcal{O}(N \log N)$. The efficiency of calculating the multiplication could be exploited in solving the linear equations with conjugate gradient method, because the conjugate gradient needs to compute the multiplication during the iteration which acts as the bottleneck of the computational complexity. Not only is the computation sped up by adapting FFT, but also the storage requirement is alleviated because we don't have to compute the matrix F"(b, b̄) explicitly. It is also noted that the gradient F'(b, b̄) could also be computed with FFT. And hence, the search direction is solved with a conjugate method which is fast and efficient. After the search direction is obtained, one can use a line search method to find a proper step size to update the estimation of current step with the search direction. The computational time can be further reduced by parallelizing the computing in the gradient calculation and the multiplication of Hessian matrix with a vector.

4. Results

The experimental setup used for demonstration is shown FIG. 1. An incoherent white light source 32, filtered by a narrow-band color filter 34 with center wavelength 650 nm, is placed at the front focal plane of the condenser 40. The spatial coherence of the illumination is adjusted by the size of an iris placed immediately behind the color filter. A 4f system 30 images the object onto the camera 44 and a through focus intensity stack 46 is taken by moving the sample along the optical axis (or moving the camera or objective).

Figure 3A:
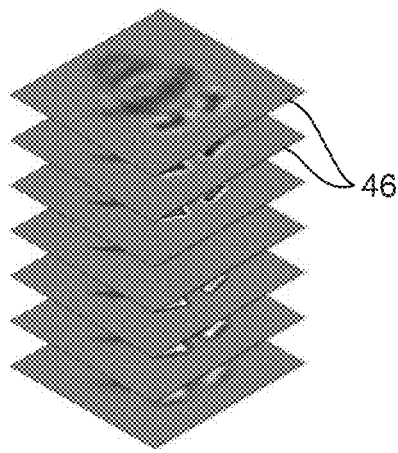
FIG. 3A shows a stack of simulated noisy intensity images with partially coherent illumination.

The efficacy of the system and method of the present description are first demonstrated by simulating a phase and amplitude object illuminated by a circular incoherent source 32 (2 mm in diameter, and the focal length of the condenser 40 is 10 mm). An intensity stack 46, partially shown in FIG. 3A, comprised of 101 images that were generated by defocusing the object symmetrically about the focus with 10 mm step size. The data was further corrupted by white Gaussian noise with a variance of 0.0015.

Figure 3B:
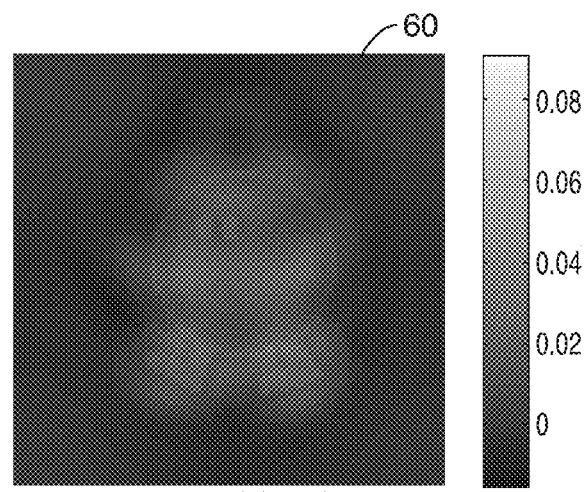
FIG. 3B shows an image phase recovered by sparse ACEKF which ignores partial coherence.

To demonstrate the effect of partial coherence, the data was first processed using a fully coherent model, with results shown the output image 60 in FIG. 3B. Significant blur present in the coherent phase reconstruction result is caused by the intensity smearing due to off-center source points, which cause the illumination to be less coherent and the model to break down.

Figure 3C:
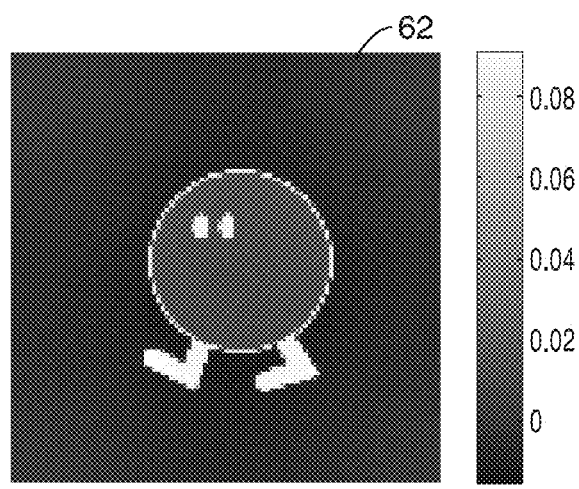
FIG. 3C shows an image phase recovered by use of the Kalman filtering method of the present description which includes partial coherence.

The phase reconstruction by incorporating partially coherent illumination, on the other hand, successfully eliminates the blurring artifact, as shown in the output image 62 FIG. 3C.

Figure 4A:
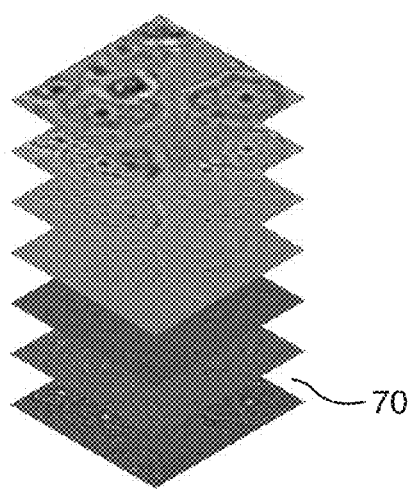
FIG. 4A shows biological intensity images through focus, with partially coherent illumination.
Figure 4B:
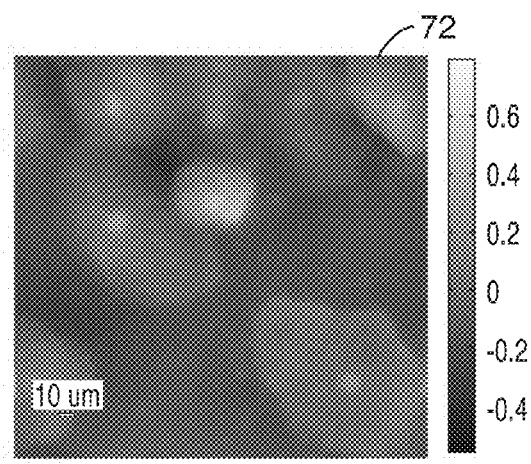
FIG. 4B shows an image phase recovered by sparse ACEKF assuming fully coherent illumination.
Figure 4C:
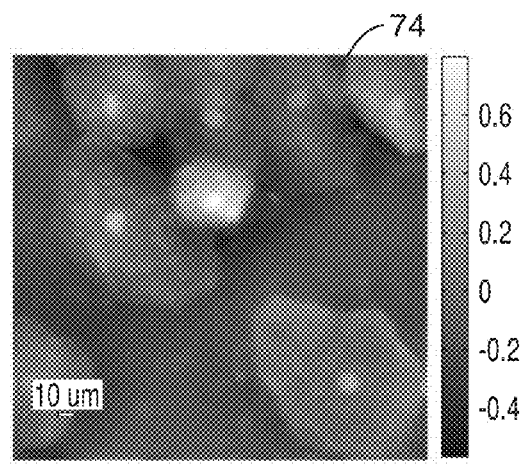
FIG. 4C shows an image phase recovered by Kalman filtering with knowledge of the source shape.

Next, the system and methods of the present description were evaluated experimentally with a biological sample and a microscope. A cheek cell sample was defocused symmetrically about the focus at 81 z-planes ranging from −2.5 mm to 2.5 mm, shown as images 70 in FIG. 4A. Each image contains 701×625 pixels. The circular iris had a 2 mm diameter and the light is collimated by a 100 mm focal length condenser. FIG. 4B shows image phase 72 recovered by sparse ACEKF assuming fully coherent illumination. FIG. 4C shows an image phase 74 recovered by Kalman filtering with partial coherence.

As seen in FIG. 4B and FIG. 4C, the phase recovered by the partially coherent Kalman filtering method of the present description has higher contrast and shows much more detail inside the cell, giving a much improved result.

Referring now to FIG. 5, the method of the present description was further evaluated with different levels of partial coherence (different source shapes) on the microscope. The temporal coherence is not considered here since the white light is filtered by a color filter of 550 nm. Intensity focal stacks were taken with different source shapes to vary the partial coherence of the illumination. For the first three shapes, the sizes were varied by opening the condenser aperture. The ring shape in the fourth case was obtained by choosing the annular diagram of the Phi condenser. Note that the objective lens is not a Phi type, so the images are still brightfield mode. The images of the source shapes were taken by adding a 2f system at the side port of the microscope. For each shape, the same cheek cell sample was defocused symmetrically about the focus at 131 z-planes ranging from −32.5 μm to 32.5 μm. Each image contains 800 by 800 pixels.

FIG. 5 compares the recovered phase images using the coherent Kalman filter and the partially coherent Kalman filter of the present disclosure. As the coherence decreases (aperture opens up), the phase images from the coherent Kalman filter become more blurred. However, the recovered phase images from the partially coherent Kalman filter still have high contrast and contain fine details.

5. Alternative Configurations

The above experimental demonstrations involve sources of increasing radius circles and intensity images with propagation as the transfer function. In fact, the method of the present disclosure is more general and can be used with any size or shape of source (dipole, quadropole, etc.), simply by modifying the shape in the convolution of Eq. 2. Further, the transfer function between consecutive images, H, can be of any complex form, without changing the algorithm or method. Propagation is just one example, as it is the most common scheme, but one could instead place filters in the imaging pathway successively to collect various images with different types of phase contrast.

The nonlinear least square error method is derived to recover phase from partially coherent intensity images. However, the algorithm could be adapted into similar situations. For example, the cost function takes form:

$$\min_b F = \frac{1}{2} \sum_{n=1}^{N_{im}} (I_n - C_n |A_n b|^2)^H (I_n - C_n |A_n b|^2) \qquad \text{Eq. 13}$$

where b is the unknown, and the matrix A denotes the transfer function. The Hessian (or its approximation) and gradient could take the same form:

$$F'(b, \bar{b}) = \sum_{n=1}^{N_{im}} \begin{bmatrix} -A_n^H \text{diag}(A_n b) C_n^H \\ -A_n^T \text{diag}(\overline{A_n b}) C_n^H \end{bmatrix} [I_n - C_n |A_n b|^2], \qquad \text{Eq. 14}$$

-continued $$F''(b, \bar{b}) \approx \sum_{n=1}^{N_{im}} \begin{bmatrix} A_n^H \text{diag}(A_n b) C_n^H & A_n^H \text{diag}(A_n b) C_n^H \\ C_n \text{diag}(\overline{A_n} \bar{b}) A_n & C_n \text{diag}(A_n b) \overline{A}_n \\ A_n^T \text{diag}(\overline{A_n} \bar{b}) C_n^H & A_n^T \text{diag}(\overline{A_n} \bar{b}) C_n^H \\ C_n \text{diag}(\overline{A_n} \bar{b}) A_n & C_n \text{diag}(A_n b) \overline{A}_n \end{bmatrix}.$$ Eq. 15

The same idea could be easily adapted to solve the big linear equations related to $F''(b, \bar{b})$ when the multiplication of $F''(b, \bar{b})$ with a vector can be computed efficiently, for example with FFT. For example, in case phase recovery from coherent intensity, the matrices $C_n$ are identity matrix and the matrix $A_n = K^H H_n$. And hence the multiplication of $F''(b, \bar{b})$ with a vector could be computed with FFT. In the case of ptychography or Fourier ptychography, the multiplication of $F''(b, \bar{b})$ with a vector could also be computed efficiently. Specifically, it should be noted that in some cases the Hessian, instead of its approximation, could be derived explicitly, the error in the cost function could be weighted, and an extra regularization over the estimation could be added to the cost function. In all of these situations, the same idea could be used as long as the multiplication of a big matrix with a vector could be computed efficiently.

Another possible variation for performing partially coherent phase recovery is that extra steps may be taken to estimate the sources. The source shape's size or form is controlled by several limited number of parameters. The source estimation step could then aim to estimate these parameters. The source estimation step could also recover arbitrary source shape. Therefore, the phase can possibly be recovered from the measured intensity images without providing information of the source shape, and source shape could be recovered simultaneously.

6. Conclusion

Table 1 compares the phase recovery method of the present disclosure with phase contrast microscopy and digital holography. As seen in Table 1, significant unexpected improvements are gained from the systems and methods of the present disclosure.

Previous coherent Kalman filtering methods assume a coherent illumination in their models. The method of the present disclosure extends the model to the important case of partially coherent illumination, and recovers phase of an object when it is illuminated with partially coherent illumination. The result is a valid construct for commercial optical microscopes, electron, tabletop X-ray imaging systems (medical), synchrotron imaging systems, and lithography aerial imaging systems, among other applications.

The system and method of the present disclosure is capable of phase recovery for arbitrary shapes of Köhler illumination. In lithography, dipole or multiple illumination is widely used and phase is a well-known diagnostic test for mask and wafer defects. This new method will be crucial to phase imaging in both wafer and mask inspection and metrology.

The system and method of the present disclosure can be applied to the case of strong noise, such as low photon counts caused by high-throughput imaging. The Kalman filtering technique is robust to noise because the Kalman filter gives a near-optimal estimation from a series of noisy measurements.

The system and method of the present disclosure is valid for any variety of complex transfer functions between the captured intensity images (propagation (defocus) was used for exemplary purposes only as a simple example). Alternatively, phase or amplitude filters or other linear optical systems can replace the propagation transfer function with their appropriate transfer function to achieve a phase result with the same method.

The system and method of the present disclosure may further be refined to be computationally efficient by using a convolution model. It can be programmed to run on a Graphics Processing Unit (GPU) to achieve greater speed-up in processing times.

Embodiments of the present technology may be described with reference to flowchart illustrations of methods and systems according to embodiments of the technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart (s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula (e), or computational depiction(s).

It will further be appreciated that the terms "programming" or "program executable" as used herein refer to one or more instructions that can be executed by a processor to perform a function as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors. It will further be appreciated that as used herein, that the terms processor, computer processor, central processing unit (CPU), and computer are used synonymously to denote a device capable of executing the instructions and communicating with input/output interfaces and/or peripheral devices.

From the description herein, it will be appreciated that that the present disclosure encompasses multiple embodiments which include, but are not limited to, the following:

1. A system for phase recovery of an intensity image with partially coherent illumination, the system comprising: (a) a computer processor; and (b) a memory storing instructions executable on the processor; (c) the instructions, when executed, performing the steps comprising: (i) mathematically modeling partial coherence with respect to the intensity image; (ii) formulating a state-space Kalman filter from the partial coherence model; and (iii) applying a standard Kalman filter to the state-space Kalman filter to estimate a phase with respect to the intensity image.

2. The system of any preceding embodiment, wherein the image comprises a stack of defocused intensity images; and wherein a propagation transfer function is applied between captured intensity images 3. The system of any preceding embodiment, further comprising: applying a sparse model to the Kalman filter to reduce computational complexity.

4. The system of any preceding embodiment, wherein the sparse model optimizes according to:

$$\hat{a}_n = K^H \hat{b}_n$$

$$Q_n = \hat{Q}_n - (\hat{Q}_n + \hat{P}_n)(\hat{Q}_n + \hat{P}_n + (\hat{Q}_n)^* + (\hat{P}_n)^* + qS^{-2})^{-1}(\hat{Q}_n + (\hat{P}_n)^*)$$

$$P_n = \hat{P}_n - (\hat{Q}_n + \hat{P}_n)(\hat{Q}_n + \hat{P}_n + (\hat{Q}_n)^* + (\hat{P}_n)^* + qS^{-2})^{-1}(\hat{P}_n + (\hat{Q}_n)^*)$$

$$b_n = \hat{b}_n + (Q_n + P_n)K\mathrm{diag}(\hat{a}_n)C_n R^{-1}(I_n - \gamma|\hat{a}_n|^2);$$

where $\hat{a}_n$ is the state predicted from the previous n−1 observations, $I_n$ and $b_n$ are discretized column vectors, $C_n$ describes convolution of scaled source intensity distribution, and K is the discrete Fourier transform (DFT) matrix.

5. The system of any preceding embodiment, wherein the instructions are configured for estimating a phase with respect to a partially coherent intensity image generated from one or more of: optical microscopes, electron imaging systems, tabletop X-ray imaging systems, synchrotron imaging systems, and lithography aerial imaging systems.

6. The system of any preceding embodiment, wherein the instructions are configured for estimating phase for an image having an arbitrary shape of Köhler illumination.

7. The system of any preceding embodiment, wherein the image comprises a stack of intensity images; and wherein phase or amplitude filters or other linear optical systems are applied as a transfer function between captured intensity images.

8. A method for phase recovery of an intensity image with partially coherent illumination, the method comprising: (a) mathematically modeling partial coherence with respect to the intensity image; (b) formulating a state-space Kalman filter from the partial coherence model; and (c) applying a standard Kalman filter to the state-space Kalman filter to estimate a phase with respect to the intensity image; (d) wherein said method is performed by executing programming on at least one computer processor, said programming residing on a non-transitory medium readable by the computer processor.

9. The method of any preceding embodiment, wherein the image comprises a stack of defocused intensity images; and wherein a propagation transfer function is applied between captured intensity images.

10. The method of any preceding embodiment, further comprising: applying a sparse model to the Kalman filter to reduce computational complexity.

11. The method of any preceding embodiment, wherein the sparse model optimizes according to:

$$\hat{a}_n = K^H \hat{b}_n$$

$$Q_n = \hat{Q}_n - (\hat{Q}_n + \hat{P}_n)(\hat{Q}_n + \hat{P}_n + (\hat{Q}_n)^* + (\hat{P}_n)^* + qS^{-2})^{-1}(\hat{Q}_n + (\hat{P}_n)^*)$$

$$P_n = \hat{P}_n - (\hat{Q}_n + \hat{P}_n)(\hat{Q}_n + \hat{P}_n + (\hat{Q}_n)^* + (\hat{P}_n)^* + qS^{-2})^{-1}(\hat{P}_n + (\hat{Q}_n)^*)$$

$$b_n = \hat{b}_n + (Q_n + P_n)K\mathrm{diag}(\hat{a}_n)C_n R^{-1}(I_n - \gamma|\hat{a}_n|^2);$$

where $\hat{a}_n$ is the state predicted from the previous n−1 observations, $I_n$ and $b_n$ are discretized column vectors, $C_n$ describes convolution of scaled source intensity distribution, and K is the discrete Fourier transform (DFT) matrix.

12. The method of any preceding embodiment, wherein the method is configured for estimating a phase with respect to a partially coherent intensity image generated from one or more of: optical microscopes, electron imaging systems, tabletop X-ray imaging systems, synchrotron imaging systems, and lithography aerial imaging systems.

13. The method of any preceding embodiment, wherein the method is configured for estimating phase for an image having an arbitrary shape of Köhler illumination.

14. The system of any preceding embodiment, wherein the image comprises a stack of intensity images; and wherein phase or amplitude filters or other linear optical systems are applied as a transfer function between captured intensity images.

15. A system for phase recovery of an intensity image with partially coherent illumination, the system comprising: (a) a computer processor; and (b) a memory storing instructions executable on the processor; (c) the instructions, when executed, performing the steps comprising: (i) mathematically modeling partial coherence with respect to one or more intensity image having partially coherent illumination; (ii) applying a nonlinear least square error function to fit over the one or more measured intensity images; and (iii) estimating a phase with respect to the one or more intensity images.

16. The system of any preceding embodiment, wherein applying a nonlinear least square error function comprises finding an optimal estimation to minimize an average square error between measurement and predicted measurement (cost function) with respect to the one or more intensity images.

17. The system of any preceding embodiment, wherein applying a nonlinear least square error function comprises: minimizing the cost function using nonlinear least square error method; and deriving a gradient and Hessian.

18. The system of any preceding embodiment, further comprising: computing a multiplication of the Hessian with vector with Fast Fourier transform (FFT).

19. The system of any preceding embodiment, wherein one or more of the following algorithms are used to solve for said phase: gradient descent, L-BFGS, Newton's, Gauss-Newton, Levenberg-Marquardt, or other nonlinear conjugate gradient algorithms.

20. The system of any preceding embodiment, wherein the gradient and Hessian are computed according to:

$$F'(b,\overline{b}) = \sum_{n=1}^{N_{im}} \begin{bmatrix} -A_n^H \text{diag}(A_n b) C_n^H \\ -A_n^T \text{diag}(\overline{A_n}\overline{b}) C_n^H \end{bmatrix} [I_n - C_n|A_n b|^2];$$

$$F''(b,\overline{b}) \approx \sum_{n=1}^{N_{im}} \begin{bmatrix} \overline{H}_n K \text{diag}(K^H H_n b) C_n^H & \overline{H}_n K \text{diag}(K^H H_n b) C_n^H \\ C_n \text{diag}(K\overline{H}_n \overline{b}) K^H H_n & C_n \text{diag}(K^H H_n b) K \overline{H}_n \\ H_n K^H \text{diag}(K\overline{H}_n \overline{b}) C_n^H & H_n K^H \text{diag}(K\overline{H}_n \overline{b}) C_n^H \\ C_n \text{diag}(K\overline{H}_n \overline{b}) K^H H_n & C_n \text{diag}(K^H H_n b) K \overline{H}_n \end{bmatrix}.$$

21. The system of any preceding embodiment, further comprising solving the linear equations system:

$$F''(b,\overline{b}) \begin{bmatrix} x \\ \overline{x} \end{bmatrix} = -F'(b,\overline{b}).$$

22. The system of any preceding embodiment, wherein the linear equation is solved as a function of a conjugate gradient method iteratively by computing the gradient and the multiplication of the Hessian with a vector with FFT.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Advantages Over Phase Contrast Microscopy And Digital Holography

| Property | Phase Contrast Microscopy | Digital Holography | Partially Coherent Phase Recovery |
|---|---|---|---|
| Digital processing | Difficult | Yes | Yes |
| Phase wrapping problem | No | Yes | No |
| Quantitative | No | Yes | Yes |
| Noise resilient | No | No | Yes |

TABLE 1-continued

Advantages Over Phase Contrast Microscopy And Digital Holography

| Property | Phase Contrast Microscopy | Digital Holography | Partially Coherent Phase Recovery |
|---|---|---|---|
| Experimental setup | Complicated | Complicated | Simple |
| Real-time imaging | Yes | Potentially | Yes |

TABLE 2

Sparse Augmented Complex Extended Kalman Filter For Estimating A Wave Field

1. Initialization $b_0$, $Q_0$ and $P_0$.
2. Prediction: $\hat{b}_n = Hb_{n-1}$; $\hat{Q}_n = Q_{n-1}$; $\hat{P}_n = HP_{n-1}H$.
3. Update:
   $\hat{a}_n = K^H \hat{b}_n$
   $Q_n = \hat{Q}_n - (\hat{Q}_n + \hat{P}_n)(\hat{Q}_n + \hat{P}_n + (\hat{Q}_n)^* + (\hat{P}_n)^* + qS^{-2})^{-1}(\hat{Q}_n + (\hat{P}_n)^*)$
   $P_n = \hat{P}_n - (\hat{Q}_n + \hat{P}_n)(\hat{Q}_n + \hat{P}_n + (\hat{Q}_n)^* + (\hat{P}_n)^* + qS^{-2})^{-1}(\hat{P}_n + (\hat{Q}_n)^*)$
   $b_n = \hat{b}_n + (Q_n + P_n) K \text{diag}(\hat{a}_n) C_n R^{-1}(I_n - \gamma|\hat{a}_n|^2)$.

What is claimed is:

1. A system for phase recovery of an intensity image with partially coherent illumination, the system comprising:
   (a) a computer processor; and
   (b) a memory storing instructions executable on the processor;
   (c) the instructions, when executed, performing the steps comprising:
      (i) mathematically modeling partial coherence with respect to the intensity image;
      (ii) formulating a statespace Kalman filter from the partial coherence model; and
      (iii) applying a standard Kalman filter to the statespace Kalman filter to estimate a phase with respect to the intensity image;
      (iv) applying a sparse model to the Kalman filter to reduce computational complexity;
      (v) wherein the sparse model optimizes according to:

$\hat{a}_n = K^H \hat{b}_n$ $Q_n = \hat{Q}_n - (\hat{Q}_n + \hat{P}_n)(\hat{Q}_n + \hat{P}_n + (\hat{Q}_n)^* + (\hat{P}_n)^* + qS^{-2})^{-1}(\hat{Q}_n + (\hat{P}_n)^*)$ $P_n = \hat{P}_n - (\hat{Q}_n + \hat{P}_n)(\hat{Q}_n + \hat{P}_n + (\hat{Q}_n)^* + (\hat{P}_n)^* + qS^{-2})^{-1}(\hat{P}_n + (\hat{Q}_n)^*)$ $b_n = \hat{b}_n + (Q_n + P_n) K \text{diag}(\hat{a}_n) C_n R^{-1}(I_n - \gamma|\hat{a}_n|^2);$ where $\hat{a}_n$ is the state predicted from the previous n−1 observations, $I_n$ and $b_n$ are discretized column vectors, $C_n$ describes convolution of scaled source intensity distribution, and K is the discrete Fourier transform (DFT) matrix.

2. A system as recited in claim 1, wherein the image comprises a stack of defocused intensity images; and
   wherein a propagation transfer function is applied between captured intensity images.

3. A system as recited in claim 1, wherein the instructions are configured for estimating a phase with respect to a partially coherent intensity image generated from one or more of: optical microscopes, electron imaging systems, tabletop X-ray imaging systems, synchrotron imaging systems, and lithography aerial imaging systems.

4. A system as recited in claim 1, wherein the instructions are configured for estimating phase for an image having an arbitrary shape of Köhler illumination.

5. A system as recited in claim 1, wherein the image comprises a stack of intensity images; and
  wherein phase or amplitude filters or other linear optical systems are applied as a transfer function between captured intensity images.

6. A method for phase recovery of an intensity image with partially coherent illumination, the method comprising:
  (a) mathematically modeling partial coherence with respect to the intensity image;
  (b) formulating a state-space Kalman filter from the partial coherence model; and
  (c) applying a standard Kalman filter to the state-space Kalman filter to estimate a phase with respect to the intensity image;
  (d) wherein said method is performed by executing programming on at least one computer processor, said programming residing on a non-transitory medium readable by the computer processor;
  (e) applying a sparse model to the Kalman filter to reduce computational complexity;
  (f) wherein the sparse model optimizes according to:

$$\hat{a}_n = K^H \hat{b}_n$$

$$Q_n = \hat{Q}_n - (\hat{Q}_n + \hat{P}_n)(\hat{Q}_n + \hat{P}_n + (\hat{Q}_n)^* + (\hat{P}_n)^* + qS^{-2})^{-1}(\hat{Q}_n + (\hat{P}_n)^*)$$

$$P_n = \hat{P}_n - (\hat{Q}_n + \hat{P}_n)(\hat{Q}_n + \hat{P}_n + (\hat{Q}_n)^* + (\hat{P}_n)^* + qS^{-2})^{-1}(\hat{P}_n + (\hat{Q}_n)^*)$$

$$b_n = \hat{b}_n + (Q_n + P_n)K\mathrm{diag}(\hat{a}_n)C_n R^{-1}(I_n - \gamma|\hat{a}_n|^2);$$

where $\hat{a}_n$ is the state predicted from the previous n−1 observations, $I_n$ and $b_n$ are discretized column vectors, $C_n$ describes convolution of scaled source intensity distribution, and K is the discrete Fourier transform (DFT) matrix.

7. A method as recited in claim 6, wherein the image comprises a stack of defocused intensity images; and
  wherein a propagation transfer function is applied between captured intensity images.

8. A method as recited in claim 6, wherein the method is configured for estimating a phase with respect to a partially coherent intensity image generated from one or more of: optical microscopes, electron imaging systems, tabletop X-ray imaging systems, synchrotron imaging systems, and lithography aerial imaging systems.

9. A method as recited in claim 6, wherein the method is configured for estimating phase for an image having an arbitrary shape of Köhler illumination.

10. A system as recited in claim 6, wherein the image comprises a stack of intensity images; and
  wherein phase or amplitude filters or other linear optical systems are applied as a transfer function between captured intensity images.

11. A system for phase recovery of an intensity image with partially coherent illumination, the system comprising:
  (a) a computer processor; and
  (b) a memory storing instructions executable on the processor;
  (c) the instructions, when executed, performing the steps comprising:
    (i) mathematically modeling partial coherence with respect to one or more intensity image having partially coherent illumination;
    (ii) applying a nonlinear least square error function to fit over the one or more measured intensity images; and
    (iii) estimating a phase with respect to the one or more intensity images;
    (iv) wherein applying a nonlinear least square error function comprises:
      finding an optimal estimation to minimize an average square error between measurement and predicted measurement (cost function) with respect to the one or more intensity images;
      minimizing the cost function using nonlinear least square error method; and
      deriving a gradient and Hessian;
      wherein the gradient and Hessian are computed according to:

$$F'(b,\bar{b}) = \sum_{n=1}^{N_{im}} \begin{bmatrix} -A_n^H \mathrm{diag}(A_n b) C_n \\ -A_n^T \mathrm{diag}(\bar{A}_n \bar{b}) C_n^H \end{bmatrix} [I_n - C_n^H |A_n b|^2];$$

$$F''(b,\bar{b}) \approx \sum_{n=1}^{N_{im}} \begin{bmatrix} \bar{H}_n K \mathrm{diag}(K^H H_n b) C_n^H & \bar{H}_n K \mathrm{diag}(K^H H_n b) C_n^H \\ C_n \mathrm{diag}(K \bar{H}_n \bar{b}) K^H H_n & C_n \mathrm{diag}(K^H H_n b) K \bar{H}_n \\ H_n K^H \mathrm{diag}(K \bar{H}_n \bar{b}) C_n^H & H_n K^H \mathrm{diag}(K \bar{H}_n \bar{b}) C_n^H \\ C_n \mathrm{diag}(K \bar{H}_n \bar{b}) K^H H_n & C_n \mathrm{diag}(K^H H_n b) K \bar{H}_n \end{bmatrix}.$$

12. A system as recited in claim 11, further comprising: computing a multiplication of the Hessian with vector with Fast Fourier transform (FFT).

13. A system as recited in claim 11, further comprising solving the linear equations system:

$$F''(b,\bar{b}) \begin{bmatrix} x \\ \bar{x} \end{bmatrix} = -F'(b,\bar{b}).$$

14. A system as recited in claim 13, wherein the linear equation is solved as a function of a conjugate gradient method iteratively by computing the gradient and the multiplication of the Hessian with a vector with FFT.

\* \* \* \* \*